(No Model.)
E. B. CHAPPELL.
SELF WATERING FLOWER VASE.
No. 283,966. Patented Aug. 28, 1883.
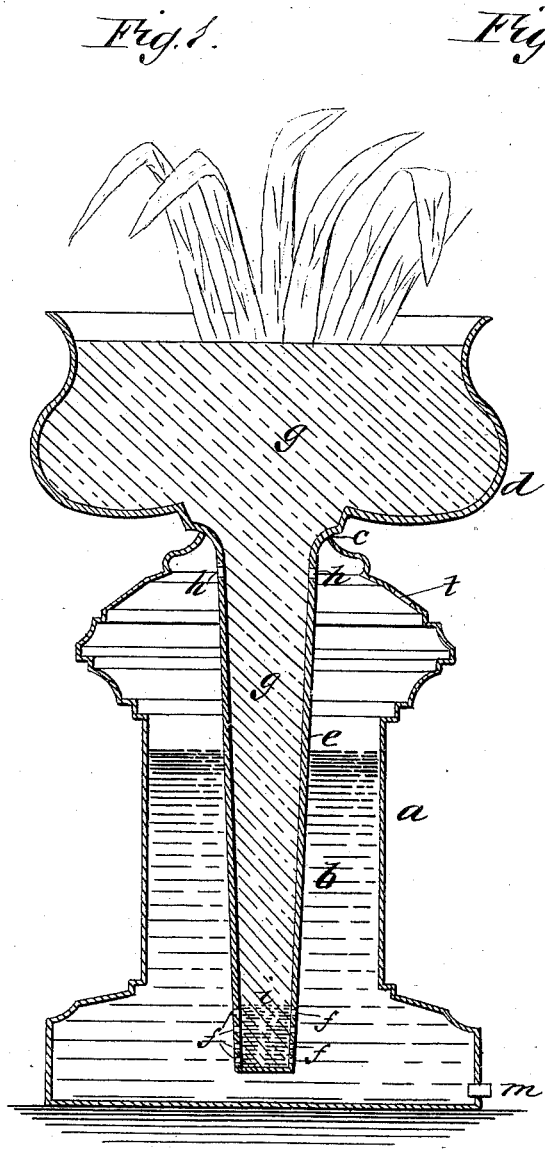
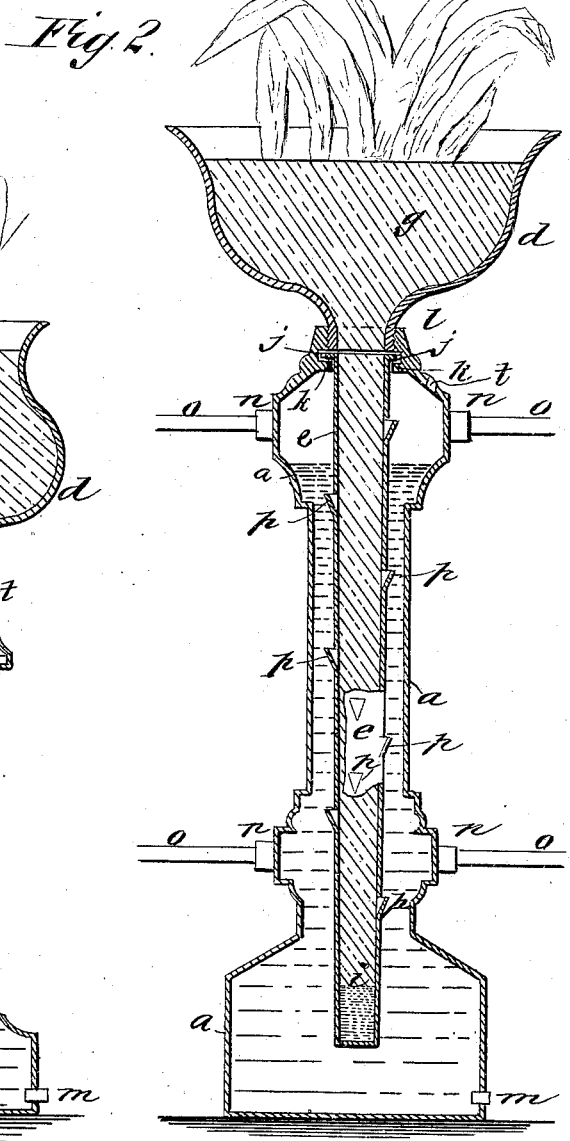
WITNESSES:
Frances McArdle
C. Sedgwick
INVENTOR:
E. B. Chappell
BY Munn & Co
ATTORNEYS.

UNITED STATES PATENT OFFICE.

EDWIN BEARE CHAPPELL, OF BRADFORD, PENNSYLVANIA.

SELF-WATERING FLOWER-VASE.

SPECIFICATION forming part of Letters Patent No. 283,966, dated August 28, 1883.

Application filed May 2, 1883. (No model.)

*To all whom it may concern:*

Be it known that I, EDWIN B. CHAPPELL, of Bradford, in the county of McKean and State of Pennsylvania, have invented a new and Improved Self-Watering Flower-Vase, of which the following is a full, clear, and exact description.

My invention consists of the base or stand of the vase, contrived for being a reservoir to contain the water for watering the plants, together with a tubular extension of the bottom of the basin, for holding the earth and flowers into the water-space of the stand, to receive the water through small holes into the earth contained in the basin for ascending to the roots above, the flower-basin and the stand being preferably made separate, to enable the basin to be removed to facilitate the cleaning of it from time to time, and for any other purpose.

My invention also consists of the vase contrived with rail or pipe connections for utilizing it for a fence-post, so that by the connection of a series of such vases an ornamental fence is provided, the posts of which are surmounted with self-watering flower-vases, all as hereinafter fully described.

Reference is to be had to the accompanying drawings, forming a part of this specification, in which similar letters of reference indicate corresponding parts in both the figures.

Figure 1 is a sectional elevation of my improved flower-vase, and Fig. 2 is a sectional elevation of the same with the fence-rail connections.

$a$ represents the base of the vase, which is made of any approved material, enabling it to be readily made hollow for a reservoir of water, $b$; and it is also to be made in any ornamental form, for which cast-iron will generally be preferred. The said base has a large opening at $c$, in the center of the top, whereon the flower-basin $d$ rests, said basin having a tubular extension, $e$, of the bottom, projecting into the hollow space of the base to or nearly to the bottom, and having perforations $f$ near its bottom, for admitting the water to the earth $g$ contained in said extension $e$. I also provide said tube $e$ with a few small perforations, $h$, near the top, for the escape of any vapor that may generate in the reservoir in hot weather. This basin, filled with earth, and preferably having a small quantity of gravel, $i$, in the lower portion, is set on the top of the base, with the tube extending into the water, and thereby the earth in the basin is duly supplied with water by absorption as long as the water lasts.

In some cases it may be preferred to make the basin $d$ and the tube $e$ separate, in order that the basin may be taken off in case there should be a break in the earth below the bottom of the basin and the roots of the plants by the settling of the earth in the tube, the removal of the basin being to enable the space to be filled, so that the water will have the means of ascending to the basin. In this case the tube will have a collar, $j$, suspending it on a collar, $k$, in the opening at the top of the base, and the nozzle $l$ of the basin will screw into the top of the base or post. A small hole will be made in the lower part of the base, for drawing off the water when a fresh supply is to be provided, and to prevent freezing in winter, said hole to be closed by a plug at $m$.

In Fig. 2 I have represented the base as a hollow fence-post for an ornamental fence, and having sockets $n$ for the connection of the rails $o$, thus making provision for the maintenance of flowers on the fence with much less care and attention than when the ordinary vases are employed.

In some cases it may be preferred to perforate the tube $e$ at intervals along its whole length, for enabling the water to enter at any level, and I propose, in connection therewith, to bend or punch out a lip, $p$, to gather in the water, so to speak, as it settles down. A hole, $t$, is provided in the upper part of the base, through which to pour water for filling the base without disturbing the basin $d$.

Having thus described my invention, I claim as new and desire to secure by Letters Patent—

1. The combination, in a flower-vase, of a hollow base, $a$, a tube, $e$, and a basin, $d$, the tube being disconnected from the bottom of the basin and suspended in the top of the base, and the basin being removably connected with said top of the base, and thereby forming connection with the tube, said tube having perforations to admit the water, substantially as described.

2. The combination, in a flower-vase, of a hollow base, *a*, having rail-socket connections *n*, a basin, *d*, and a tubular extension, *e*, of the basin into said hollow base, substantially as described.

EDWIN BEARE CHAPPELL.

Witnesses:
WILLIAM R. MERCHANT,
E. V. CODY.